(12) United States Patent
Nazzer

(10) Patent No.: US 11,752,447 B2
(45) Date of Patent: Sep. 12, 2023

(54) METHODS FOR SEPARATING WATER AND CONTAMINANTS FROM VALUABLE OR HARMFUL PROCESS LIQUIDS

(71) Applicants: Prime Services Trustee Limited, New Plymouth (NZ); VBW Trustees No. 2 Limited, New Plymouth (NZ)

(72) Inventor: Craig Nazzer, New Plymouth (NZ)

(73) Assignees: Prime Services Trustee Limited, New Plymouth (NZ); VBW Trustees No. 2 Limited, New Plymouth (NZ)

( * ) Notice: Subject to any disclaimer, the term of this patent is extended or adjusted under 35 U.S.C. 154(b) by 0 days.

(21) Appl. No.: 17/826,066

(22) Filed: May 26, 2022

(65) Prior Publication Data
US 2022/0379234 A1 Dec. 1, 2022

(51) Int. Cl.
*B01D 3/06* (2006.01)
*B01D 3/34* (2006.01)
*B01D 1/00* (2006.01)
*B01D 1/14* (2006.01)

(52) U.S. Cl.
CPC .............. *B01D 3/06* (2013.01); *B01D 1/0041* (2013.01); *B01D 1/14* (2013.01); *B01D 3/34* (2013.01)

(58) Field of Classification Search
CPC .................................................. C02F 1/04–18
USPC .................................................. 159/DIG. 33
See application file for complete search history.

(56) References Cited

U.S. PATENT DOCUMENTS

| | | | | |
|---|---|---|---|---|
| 1,997,980 A * | 4/1935 | Smith | .................... | C10G 17/10 |
| | | | | 159/DIG. 25 |
| 2,976,224 A * | 3/1961 | Gilliland | .................. | B01D 3/00 |
| | | | | 203/DIG. 17 |
| 6,685,802 B1 * | 2/2004 | Nazzer | ..................... | B01D 3/06 |
| | | | | 159/901 |
| 8,652,304 B2 * | 2/2014 | Nazzer | ..................... | C10L 3/10 |
| | | | | 159/901 |
| 8,728,321 B2 * | 5/2014 | Nazzer | ................. | B01D 9/0031 |
| | | | | 210/643 |
| 10,213,705 B2 * | 2/2019 | Abry | ...................... | B01D 3/143 |
| 10,328,360 B2 * | 6/2019 | Zheng | .................. | B01D 1/0041 |
| 10,335,708 B2 * | 7/2019 | Zheng | ...................... | F22B 1/02 |
| 10,370,264 B2 * | 8/2019 | Zheng | ..................... | B01D 1/14 |
| 10,471,366 B2 * | 11/2019 | Zheng | ..................... | B01D 3/34 |
| 10,478,745 B2 * | 11/2019 | Zheng | ..................... | B01D 3/007 |
| 10,864,456 B2 * | 12/2020 | Zheng | ..................... | B01D 1/0064 |
| 10,918,966 B2 * | 2/2021 | Zheng | .................. | B01D 1/0041 |
| 11,072,541 B2 * | 7/2021 | Nazzer | .................... | C02F 1/004 |
| 11,083,974 B2 * | 8/2021 | Zheng | ..................... | B01D 1/14 |
| 11,524,927 B2 * | 12/2022 | King | ...................... | C07C 29/80 |
| 2008/0283471 A1 * | 11/2008 | Nazzer | ................... | B01D 21/009 |
| | | | | 210/207 |

(Continued)

*Primary Examiner* — Jonathan Luke Pilcher
(74) *Attorney, Agent, or Firm* — Todd Martin

(57) ABSTRACT

The present disclosure is a method of removing contaminants from a feed stream comprising said contaminants and process liquid by bringing the feed stream into contact with a heated heating fluid in or in proximity to a separation vessel thereby causing process liquid to vaporise and flow out of the separation vessel as vapour, after which it can be recovered. Embodiments of the method may include using a heavy heating fluid whose density is higher than that of the feed stream and/or vigorously agitating the pool of heating fluid in the separation vessel.

6 Claims, 2 Drawing Sheets

(56) References Cited

U.S. PATENT DOCUMENTS

| | | | |
|---|---|---|---|
| 2010/0264091 A1* | 10/2010 | Nazzer | B01D 9/0031 210/704 |
| 2011/0094871 A1* | 4/2011 | Nazzer | C10L 3/10 202/168 |
| 2014/0374365 A1* | 12/2014 | Nazzer | B01D 29/865 210/435 |
| 2016/0271531 A1* | 9/2016 | Nazzer | B01D 29/01 |
| 2017/0015613 A1* | 1/2017 | King | B01D 3/06 |
| 2017/0203229 A1* | 7/2017 | Abry | B01D 3/34 |
| 2017/0368468 A1* | 12/2017 | Zheng | B01D 1/0064 |
| 2017/0368469 A1* | 12/2017 | Zheng | B01D 5/006 |
| 2017/0368470 A1* | 12/2017 | Zheng | C02F 1/10 |
| 2017/0368471 A1* | 12/2017 | Zheng | C02F 1/048 |
| 2017/0370650 A1* | 12/2017 | Zheng | B01D 1/0041 |
| 2018/0222769 A1* | 8/2018 | Nazzer | C02F 1/004 |
| 2019/0262740 A1* | 8/2019 | Zheng | B01D 1/2856 |
| 2019/0270030 A1* | 9/2019 | Zheng | B01D 1/0041 |
| 2020/0039843 A1* | 2/2020 | Zheng | B01D 1/14 |
| 2020/0079713 A1* | 3/2020 | King | B01D 3/06 |
| 2021/0268398 A1* | 9/2021 | Zheng | B01D 1/0064 |

* cited by examiner

METHODS FOR SEPARATING WATER AND CONTAMINANTS FROM VALUABLE OR HARMFUL PROCESS LIQUIDS

FIELD OF THE INVENTION

The present disclosure is directed to methods for separating water and contaminants from valuable or harmful process liquids. Examples of these process liquids include glycols and amines that are less volatile than water including those that are used for oil and gas processing.

BACKGROUND

Process liquids such as glycols and amines are used in oil and gas production and refining. They are typically less volatile than water and can become degraded by water and contaminated by dissolved salts. For economic and environmental reasons, it is standard practice to apply treatment methods to remove at least a portion of the water and contaminants and reuse the liquid. Examples of such treatment methods are disclosed in U.S. Pat. Nos. 6,685,802, 8,728,321, 8,652,304 and WO2022/035327 A1 incorporated herein by reference.

At oil and gas production facilities, the fluids that come from the oil and gas wells may contain substantial amounts of condensed water and formation water. These fluids often contain dissolved salts and other unwanted contaminating substances. At many of these facilities, mono-ethylene glycol ("MEG") is injected into hydrocarbon flow lines to inhibit the formation of hydrates that can otherwise plug pipelines. When the crude hydrocarbons are collected at the oil and gas production plant, a dilute aqueous glycol solution is typically separated from hydrocarbons using gravity. The MEG solution is then filtered and reconcentrated by boiling off water. The reconcentrated MEG is transported back upstream to be reinjected into the hydrocarbon production pipework. In this way, the glycol is reused many times. However, in the absence of remedial measures, contaminants which typically include dissolved solid matter (e.g. salts) and unwanted liquids accumulate in the lean MEG each time the MEG is separated, reconcentrated, and used again.

The contamination in the glycol can cause increased corrosion, thermal degradation of the glycol, unwanted precipitation of solid matter, fouling of heat transfer equipment and other serious, costly, operational problems. Chlorides, oxides, sulfates, bicarbonates, and carbonates of sodium, potassium, calcium, magnesium, iron, barium, and strontium are examples of inorganic contaminants. Sodium chloride is often the most prevalent dissolved contaminant in the rich MEG. Other dissolved salt contaminants comprised of divalent ions (e.g. calcium, magnesium) are also frequently present. Organic acids and organic acid salts (e.g. acetates, propionates) can also be troublesome contaminants. A major source of the dissolved contaminants is formation water that flows with the hydrocarbon fluids out of the oil and gas production wells. Another source can be the brines (e.g. calcium chloride brine and calcium bromide brine) and other fluids that are used during drilling or are injected into the flow lines during or after exploration to prepare for initial production, or as a result of well maintenance activities. Other sources of contamination might include the products of corrosion of the flow lines and the chemicals injected into the flow lines to control scaling and corrosion. In the oil and gas industry the process of removing at least a portion of the dissolved contaminants so as to maintain the quality of the glycol when it is reused is called "MEG reclamation". The MEG reclamation the process is normally run under vacuum at an absolute pressure of 0.1 to 0.5 bara so as to reduce the operating temperature which is typically good practice when treating a thermally sensitive process liquid such as MEG.

The process disclosed in U.S. Pat. No. 8,652,304 is a "flash vaporisation" process in which a separation vessel, herein termed a "flash separator", contains a pool of heating medium, herein termed "heating fluid", which may, for example, be an oil or oil-like liquid. The heating fluid is heated and makes contact with a "feed stream" that comprises process liquid and contaminants and, optionally, water, thereby rapidly heating the feed stream. Process liquid, water (if present) and other volatile components (if present) that had been in the feed stream flash vaporise and exit the flash separator. The vaporisation causes dissolved contaminants such as salts that had been in the feed stream to precipitate to form solid particles. The precipitated solid particles along with other non-volatile contaminants, if any are present, accumulate in the liquid pool in the flash separator from which they can be separated and removed.

In the present disclosure the term "Flash on Heating Fluid process" means a process that uses direct contact between a process liquid and a heated heating fluid to vaporise at least a portion of the process liquid, thereby separating contaminants from the process liquid.

The Applicant has observed that, in the absence of the embodiments described in this application, the step of mixing heated heating fluid with contaminated aqueous solutions of process liquid, including glycols or amines and the like, may cause undesirable consequences including but not limited to excessive frothing, unstable boiling, and/or excessive formation of emulsions that can impair the efficient and safe control of the process. An illustrative example of one such type of undesirable consequence can be observed by pouring water into a pan of overheated oil on a kitchen stove—the water, being heavier than the hot oil, first sinks to the bottom then explosively boils and throws oil out of the pan.

The above described shortcomings are solved or avoided or at least ameliorated in the present disclosure in which the Flash on Heating Fluid process is substantially modified by either or both of the following embodiments: utilising what is herein termed "heavy heating fluid" that has a higher density than that of the contaminated process liquid being treated, and/or; vigorously agitating the pool of heating fluid in the flash separator in a manner that causes contaminated process liquid to break up into small droplets that then thoroughly mingle with, and are vaporised by, the heated heating fluid. One example of a means to achieve satisfactory agitation is to operate a device such as an impeller that causes the liquid pool of heating fluid in the flash separator to spin in a circular swirling motion resembling that of a whirlpool

SUMMARY OF INVENTION

In a first aspect, there is a provided a method of removing contaminants, including dissolved contaminants, from a feed stream, said feed stream comprising said contaminants and a process liquid, said method comprising the following steps:
  a) heating a heating fluid that has a higher density than that of the feed stream and is comprising components that are less volatile than the process liquid to produce a heated heating fluid;

b) bringing at least a portion of the feed stream into contact with at least a portion of the heated heating fluid to thereby heat and vaporise at least a portion of the process liquid thereby causing at least a portion of the dissolved contaminants to form precipitated solid matter;

c) enabling at least a portion of the heating fluid to mix with at least a portion of the precipitated solid matter thereby producing a depleted mixture that comprises at least a portion of the heating fluid and at least a portion of the precipitated solid matter;

d) mixing a salt solvent with at least a portion of the depleted mixture whereby said salt solvent dissolves at least a portion of the precipitated solid matter, to create a waste solution that comprises at least a portion of the contaminants; and e) separating at least a portion of the waste solution from the heating fluid.

In a second aspect, there is a provided a method of removing contaminants, including dissolved contaminants, from a feed stream, said feed stream comprising said contaminants and a process liquid, said method comprising the following steps:

a) heating and agitating a heating fluid comprising components that are less volatile than the process liquid to produce a pool of heated and agitated heating fluid within a flash separator;

b) bringing at least a portion of the feed stream into contact with at least a portion of the heated and agitated heating fluid to thereby heat and vaporise at least a portion of the process liquid thereby causing at least a portion of the dissolved contaminants to form precipitated solid matter;

c) enabling at least a portion of the heating fluid to mix with at least a portion of the precipitated solid matter thereby producing a depleted mixture that comprises at least a portion of the heating fluid and at least a portion of the precipitated solid matter;

d) mixing a salt solvent with at least a portion of the depleted mixture whereby said salt solvent dissolves at least a portion of the precipitated solid matter, to create a waste solution that comprises at least a portion of the dissolved contaminants; and e) separating at least a portion of the waste solution from the heating fluid.

In said second aspect above there are provided embodiments wherein the agitation causes the pool of heated heating fluid in the flash separator to rotate in a circular swirling motion.

In said second aspect above there are provided embodiments wherein the agitation is caused by operating an agitation device located within the flash separator.

In any of the aspects above there are provided embodiments wherein the process liquid comprises any one or more liquids selected from the group comprising: mono-ethylene glycol; diethylene glycol; triethylene glycol; amines, and; other water soluble liquids.

In any of the aspects above there are provided embodiments wherein the dissolved contaminants comprise any one or more of: monovalent salts including sodium chloride; divalent ions including calcium; and organic acid salts including acetate.

In any of the aspects above there are provided embodiments wherein the heating fluid comprises components that are immiscible with the process liquid and the salt solvent.

In any of the aspects above there are provided embodiments wherein the salt solvent comprises water.

In any of the aspects above there are provided embodiments wherein at least all but a negligible remnant of the process liquid that contacts the heated heating fluid is vaporised.

In any of the aspects above there are provided embodiments wherein the flash separator is operated at a pressure below atmospheric pressure.

In any of the aspects above there are provided embodiments wherein at least a portion of the salt solvent enters the flash separator and mixes with depleted mixture and dissolves at least a portion of the precipitated solid matter thereby creating the waste solution that comprises at least a portion of the dissolved contaminants.

In any of the aspects above there are provided embodiments wherein at least a portion of the depleted mixture moves into a solvent wash system wherein at least a portion of the precipitated solid matter dissolves in at least a portion of the salt solvent, thereby creating the waste solution that comprises at least a portion of the dissolved contaminants.

In any of the aspects above there are provided embodiments wherein at least a portion of the heating fluid is heated by a heating device that is inside the flash separator.

In any of the aspects above there is provided another embodiment wherein at least a portion of the heating fluid is heated by flowing through a heater that is located outside of the flash separator.

In any of the aspects above there are provided embodiments wherein one or more heating fluid treatment means are applied to decontaminate at least a portion of the heating fluid and/or to modify the properties of the heating fluid.

In any of the aspects above there are provided embodiments wherein one or more substances are added and mixed with at least a portion of the heating fluid to modify one or more of the properties of the heating fluid including but not limited to density, vapour pressure, viscosity, thermal stability, pH, solubility, heat capacity, thermal conductivity, corrosivity, toxicity, and flammability.

In any of the aspects above there are provided embodiments wherein contaminating particles of solid matter are removed from at least a portion of the heating fluid by mechanical means of separation including but not limited to any one or more of: centrifuging, settling, clarifying, filtering, and hydrocycloning.

In any of the aspects above there are provided embodiments wherein at least all but a negligible remnant of the process liquid that contacts the heated heating fluid is vaporised.

In any of the aspects above there are provided embodiments wherein at least 90%, or preferably at least 95%, of the process liquid that contacts the heated heating fluid is vaporised.

In any of the aspects above there are provided embodiments wherein at least a portion of the vaporised process liquid is subsequently condensed.

In any of the aspects above there are provided embodiments wherein the heating fluid comprises one or more liquid components selected from any of the following groups: oils; fatty acids; heat transfer fluids; liquid metals; ionic liquids; and deep eutectic solvents.

The foregoing brief summary broadly describes the features and technical advantages of certain embodiments. Further technical advantages will be described in the detailed description that follows. Novel features that are believed to be characteristic will be better understood from the detailed description when considered in connection with the accompanying figures. However, the figures provided herein are intended to help illustrate or assist with understanding, and are not intended to limit the subject of the present disclosure.

DETAILED DESCRIPTION

The following description sets forth numerous exemplary configurations, parameters, and the like. It should be recognised, however, that such description is not intended as a limitation on the subject matter disclosed, but is instead provided as a description of exemplary embodiments.

The present disclosure provides methods to achieve the objective of separating dissolved salts and other contaminants from a feed stream that comprises said contaminants and process liquid and, optionally, water.

Figure 1:
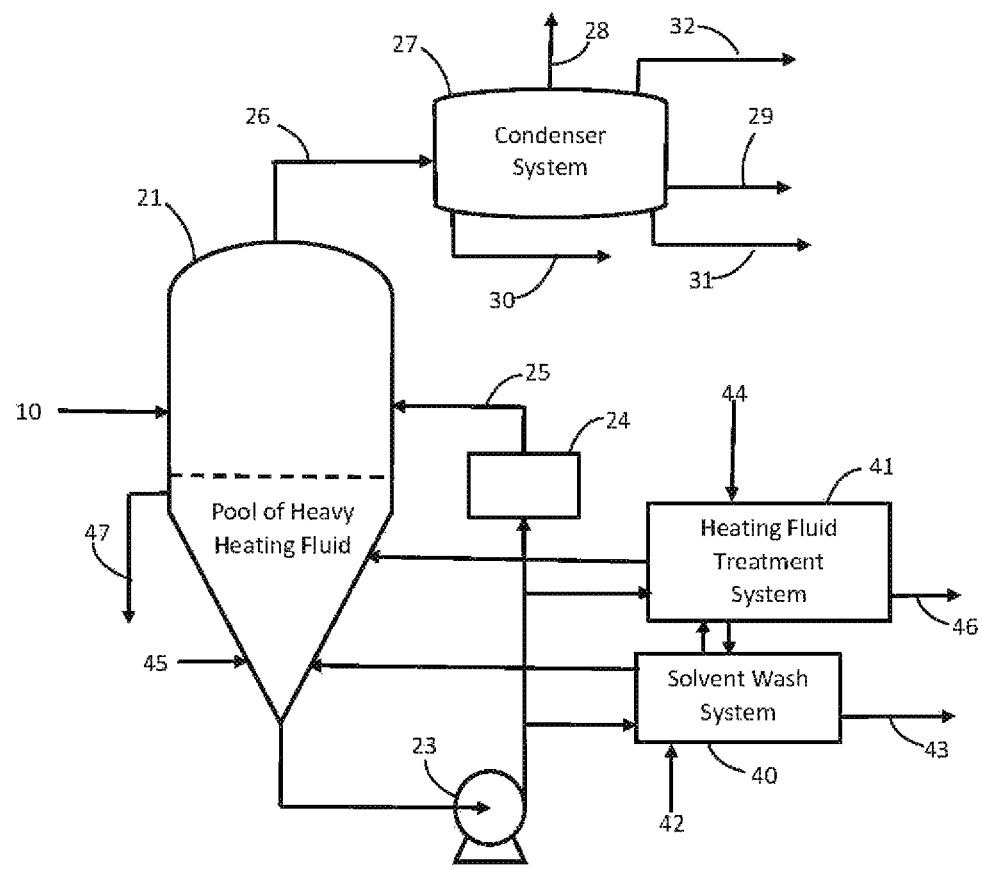
FIG. 1 presents schematically a non-limiting example of the use of the heavy heating fluid in the overall method.

FIG. 1 illustrates a non-limiting example of the use of heavy heating fluid in the overall method. With reference to the embodiment illustrated in FIG. 1, a feed stream 10 comprises volatile liquid and dissolved contaminants including salts. The volatile liquid may comprise process liquid and water (if present). Flash separator 21 (which is a separation vessel) contains a liquid pool of heating fluid, herein termed "heavy heating fluid", that has a density higher than that of the feed stream and comprises liquid components that are less volatile than the process liquid.

Pump 23 might draw heating fluid out of flash separator 21 and pump it through heater 24 to create a stream 25 of heated heating fluid. Stream 25 and stream 10 directly contact each other in one or more places upstream of and/or within flash separator 21. For example there may be one or more mixing zones or chambers upstream of flash separator 21 into which both stream 10 and stream 25, or portions thereof, flow and mix with each other. There may also be one or more multiple entrance ports into flash separator 21 for stream 10 and stream 25 thereby causing the two streams or portions thereof to contact each other inside flash separator 21. Alternatively stream 10 or a portion of it may contact the pool of heated heating fluid in flash separator 21.

Sufficient heat is added to the heating fluid in heater 24 and/or by heating the heating fluid within flash separator 21 to cause at least a significant portion of the process liquid and water (if present) in stream 10 to vaporise due to the contact between stream 10 and heated heating fluid. This vaporisation causes dissolved contaminants to precipitate and accumulate as solid particles in the liquid pool in the flash separator 21. This creates therein a mixture which is herein termed "depleted mixture" that is depleted of process liquid and which primarily comprises precipitated contaminants and heating fluid.

The high density of the heating fluid ensures that the volatile liquid in the feed stream that enters the flash separator 21 does not settle by gravity to form a layer below the heating fluid. This is one means of avoiding excessive uncontrolled vaporisation of volatile liquid in the flash separator. Unvaporised liquids in the feed stream may enter flash separator 21, float on top of the heavy heating fluid and from there heat up and vaporise. The vapour thereby created at or near the top of the liquid pool may exit the vessel as a vapor stream 26 without throwing up and entraining large volumes of hot heating fluid thereby helping to ensure that the operation of the process remains well controlled.

The high density of the heating fluid may be achieved by including high density liquid components in the heating fluid, examples of which may be one or more selected from the group comprising: ionic liquids; deep eutectic solvents; liquid metals; silicone oils; perfuorinated polyether (PFPE); vacuum pump oils. Alternatively, or additionally, small particles may be mixed with heating fluid to create stable high density slurries for inclusion in the heavy heating fluid.

In one or more embodiments at least all but a negligible remnant, of the process liquid in stream 10 might be vaporised as a result of the contact between stream 10 and the heated heating fluid. In the present disclosure, the term "negligible remnant" means an amount that is not more than the allowable maximum loss of process liquid for the particular application of the present disclosure. For example in MEG reclamation application, if the allowable maximum loss of MEG is 1% then the term "at least all but a negligible remnant of the process liquid" means at least 99% of the MEG that is in feed stream 10.

In one or more embodiments, over 90%, or preferably over 95%, of the process liquid in stream 10 might be vaporised as a result of the contact between stream 10 and the heated heating fluid.

A person skilled in the art will recognise that there are alternative feasible means of heating the heating fluid. In an embodiment at least a portion of the heating fluid might be heated while in the liquid pool of flash separator 21, for example by a submerged tube bundle or heating coils or vessel heating jacket or other type of heating device. This could be in addition to, or instead of, the pumped system shown in FIG. 1 (i.e. pump 23 and heater 24).

Figure 2:
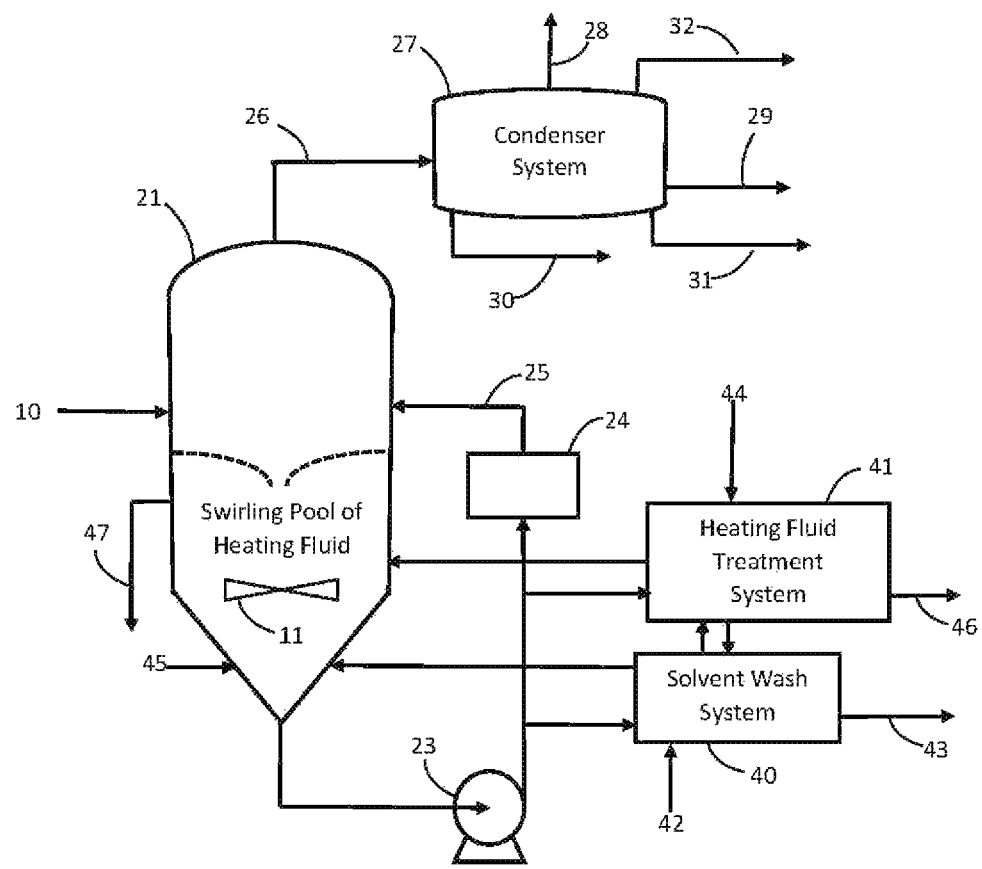
FIG. 2 presents schematically a non-limiting example of the use of the agitated pool of heating fluid within the flash separator in the overall method.

FIG. 2 illustrates a non-limiting example of vigorously agitating a pool of heating fluid in a flash separator vessel in the overall method. With reference to the embodiment illustrated in FIG. 2, a feed stream 10 comprises volatile liquid and dissolved contaminants including salts. The volatile liquid may comprise process liquid and water (if present). Flash separator 21 (which is a separation vessel) contains a liquid pool of heating fluid. Flash separator 21 also contains agitation device 11 that in normal operation vigorously agitates the liquid pool. In a non-limiting example the agitation device 11 figuratively depicted in FIG. 2 as an impeller mounted on a vertical axis causes the pool of heating fluid to be agitated in a particular manner, namely to swirl rapidly in a circular motion akin to a whirlpool. In this non-limiting example of circular swirling motion of the liquid pool, the agitation device 11 could also be a propeller mounted on a horizontal axis near the wall of flash separator 21.

Pump 23 might draw heating fluid out of flash separator 21 and pump it through heater 24 to create a stream 25 of heated heating fluid. Stream 25 and stream 10 directly contact each other in one or more places upstream of and/or within flash separator 21. For example there may be one or more mixing zones or chambers upstream of flash separator 21 into which both stream 10 and stream 25, or portions thereof, flow and mix with each other. There may also be one or more entrance ports into flash separator 21 for stream 10 and stream 25 thereby causing the two streams or portions thereof to contact each other inside flash separator 21. Alternatively stream 10 or a portion of it may contact the pool of heated heating fluid in flash separator 21.

Sufficient heat is added to the heating fluid in heater 24 and/or by heating the heating fluid within flash separator 21 to cause at least a significant portion of the process liquid and water (if present) in stream 10 to vaporise due to the contact between stream 10 and heated heating fluid. This vaporisation causes dissolved contaminants to precipitate and accumulate as solid particles in the liquid pool in the flash separator 21. This creates therein a mixture which is herein termed "depleted mixture" that is depleted of process liquid and which primarily comprises precipitated contaminants and heating fluid.

When the agitated heated heating fluid in flash separator 21 contacts unvaporised volatile liquid that may enter the flash separator 21 the vigorous fluid motion may break this liquid up into small droplets that are then rapidly and widely dispersed into the moving heating fluid. The small size of these droplets improves heat transfer from the hot heating fluid which in turn causes rapid vaporisation while avoiding the creation of large slugs of vapour.

The Applicant has observed that even if a large quantity of volatile liquid, which could have higher density than that of the heating fluid, were to accumulate in a layer below the heating fluid in flash separator 21 the agitation step helps to ensure that the process remains well controlled. In such circumstances normal stable operation can be restored by creating sufficient agitation and heating the heating fluid to a high enough temperature. The agitation breaks up and thoroughly distributes the volatile liquid into a myriad of small droplets throughout the pool of rapidly moving heating fluid. These small droplets then vaporise rapidly provided there is sufficient heat applied. Heat transfer rates are enhanced due to the heating fluid movement and the small size of the volatile liquid droplets which in turn promotes the separation of the resulting vapour from the heating fluid without creating excessive foaming or emulsions. This is a second means of avoiding excessive uncontrolled vaporisation of volatile liquid in the flash separator 21.

In one or more embodiments at least all but a negligible remnant, of the process liquid in stream 10 might be vaporised as a result of the contact between stream 10 and the heated heating fluid. In the present disclosure, the term "negligible remnant" means an amount that is not more than the allowable maximum loss of process liquid for the particular application of the present disclosure. For example in MEG reclamation application, if the allowable maximum loss of MEG is 1% then the term "at least all but a negligible remnant of the process liquid" means at least 99% of the MEG that is in feed stream 10.

In other embodiments, over 90%, or preferably over 95%, of the process liquid in stream 10 might be vaporised as a result of the contact between stream 10 and the heated heating fluid.

A person skilled in the art will recognise that there are alternative feasible means of heating the heating fluid. In an embodiment at least a portion of the heating fluid might be heated while in the liquid pool of flash separator 21, for example by a submerged tube bundle or heating coils or vessel heating jacket or other type of heating device. This could be in addition to, or instead of, the pumped system shown in FIG. 2 (i.e. pump 23 and heater 24).

The following descriptions under the headings: Separation and Removal of Contaminants; Heating Fluid Composition; and Heating Fluid Treatment Means apply to the non-limiting embodiments of the present disclosure including those illustrated in FIGS. 1 and 2.

Separation and Removal of Contaminants

Vaporised process liquid and optionally vaporised liquid contaminants and optionally vaporised liquid components of the heating fluid, exit the flash separator 21 and flow via vapor stream 26 into condenser system 27 in which separation and condensation of components of the vapour might be achieved using standard methods known to persons skilled in the art. The condenser system 27 might include equipment to enable operation of the flash separator 21 at below atmospheric pressure. Stream 28 might comprise non-condensed gases and vapour that might be subsequently removed. Stream 29 is an output product stream that may comprise concentrated process liquid. Stream 30 is optional and may comprise condensed heating fluid which can be subsequently returned to the flash separator 21 liquid pool. Stream 31 is optional and may comprise condensed liquid contaminants that are subsequently removed.

A portion of the depleted mixture might be pumped from flash separator 21 into a solvent wash system 40. A liquid, herein termed "salt solvent," that comprises components that can dissolve at least a portion of the contaminants that have precipitated to form solid matter in the depleted mixture might flow into the solvent wash system 40 via a stream 42, make contact with the depleted mixture and dissolve at least a portion of the precipitated contaminants to create a waste solution. In one or more embodiments, the heating fluid may comprise liquid components that are not miscible with the salt solvent and might be less dense than the waste solution, thereby enabling simple separation, recovery and reuse of heating fluid. The separated waste solution flows out of the solvent wash system 40 via stream 43. In the example of a MEG reclamation application, the most prevalent dissolved contaminants are water soluble salts which may enable water to be used as a component of the salt solvent.

In other applications the salt solvent may comprise other liquids (e.g. organic solvents, alcohols, deep eutectic solvents) that are capable of dissolving the particular contaminants that are present in such applications.

In one or more embodiments, the step of dissolving at least some precipitated contaminants might be done by temporarily stopping normal operation and adding salt solvent directly to the depleted mixture in the liquid pool in flash separator 21. This may require adjusting the operating temperature and pressure in the flash separator 21 to avoid boiling. The salt solvent would dissolve at least a portion of the precipitated solid matter, thereby creating a waste solution that contains dissolved contaminants and that may be separated from heating fluid and removed from flash separator 21.

In the Flash on Heating Fluid process the heating fluid might be repeatedly exposed to a wide range of substances that had originally been in feed stream 10 and have entered flash separator 21. Some of these substances might comprise unwanted contaminants (solid and liquid) that might not be removed in the solvent wash system 40. Some of these contaminants may cause the quality of the heating fluid to degrade. To rectify, or avoid, such degradation the present disclosure may include one or more embodiments whereby one or more heating fluid treatment means (HFTM), details of which are disclosed under the heading Heating Fluid Treatment Means below, to decontaminate and/or modify the properties of the heating fluid and/or provide other remedial measures to maintain or enhance the condition and performance of the heating fluid. In the non-limiting illustrations in FIGS. 1 and 2 a portion of the heating fluid might be pumped from flash separator 21 into a heating fluid treatment system 41 in which one or more of the HFTM might be performed, optionally assisted by the addition of chemicals via stream 44. Contaminants are figuratively shown being removed via stream 46.

Some HFTM may be performed by, for example, directly adding chemicals to flash separator 21 via optional stream

45, or into feed stream 10 or at another effective location, and/or removing contaminants directly from flash separator 21. Some contaminants may optionally be drained out of flash separator 21 via stream 47 or be vaporised to flow out of flash separator 21 in stream 26 after which they could be removed via stream 28 and/or stream 31.

In embodiments, the present disclosure substantially reduces the risk of loss of process liquid in the waste streams with a corresponding reduction in risk of harm to the environment. In embodiments in which at least all but a negligible remnant, of the process liquid is removed as vapour from flash separator 21, there are no means by which a non-negligible amount of process liquid can enter, and be lost with, the waste solutions that contain the contaminants.

Heating Fluid Composition

The heating fluid comprises components that are less volatile than the process liquid and selected from one or more of the following: unrefined hydrocarbon oils including undistilled crude oil, diesel, fuel oil, middle distillate, one or more other distilled crude oil fractions; refined hydrocarbon oils including base oil, hydrocracked base oil; synthetic oils and silicone oils; perfluorinated polyether (PFPE); non-hydrocarbon oils including vegetable oils, seed oils, fish oils, bio-diesel, other animal oils; fatty acids including oleic acid, erucic acid, other fatty acids; heat transfer fluids including those used in solar energy facilities; hydraulic oils, lubricating oils and transmission fluids; liquid metals including gallium and gallium alloys, woods metal, lead tin bismuth alloys, fusible alloys; ionic liquids; deep eutectic solvents; other fluids whose volatility is negligible or at least low enough to avoid excessive vaporisation and combinations thereof.

Some types of fluids have been recently discovered or invented, including many ionic liquids and deep eutectic solvents. These fluids may not yet be suitable for widespread deployment due to high cost, however they are the subject of extensive ongoing research. A non-limiting range of such fluids proposed for heat transfer applications, which might at some time in the future include potential use as components of the heating fluid in the present disclosure, is described in WO2017/085600.

Heating Fluid Treatment Means (HFTM)

The quality of the heating fluid can deteriorate over time due to its repeated mixing with contaminated process liquid. HFTM are included in this disclosure to maintain or enhance the quality of the heating fluid.

In the non-limiting example of MEG reclamation, as described above, many of the contaminants comprise water soluble salts that can be removed by including water as a component, possibly the only component, of the salt solvent. However, there can be numerous other types and sources of contamination of the heating fluid, as discussed below.

The heating fluid is continuously being mixed with more and more contaminants, day after day. These contaminants can accumulate and cause undesirable changes to the heating fluid properties such as its thermal stability, chemical stability, density, acidity, alkalinity, viscosity, boiling point, solubility, thermal conductivity, heat capacity, corrosivity, toxicity, flammability and/or surface tension. In the example of MEG reclamation, upstream systems that normally intercept or counteract contaminants (e.g. filters, chemical dosing treatments) may fail or be overwhelmed by unusual process conditions, thereby allowing slugs of contaminating substances to enter the reclamation facility and mix with the heating fluid.

Some contaminants may form an unwanted sludge or rag layer. Asphaltenes, resins, waxes and/or other organic contaminants, including those that flow from the wells, may form sticky substances that adhere to equipment surfaces and foul heaters or form troublesome sludge and gum up instrumentation. Contaminants may flow out of the of the separation vessel with the vapour stream and then re-contaminate the condensed process liquid. Contaminants may be created by the oxidation or thermal degradation of the process liquid or the heating fluid itself. Contaminants may react with the process liquid or the heating fluid to form substances that are difficult to remove.

Mercury is a toxic substance that can contaminate the fluids entering a MEG reclamation facility.

Oxygen which can enter in dissolved form in rich MEG or dissolved in added liquids or enter due to air leaks, can accelerate corrosion and the degradation of some process liquids including MEG.

Ions of calcium, sodium, potassium, barium, iron, strontium, magnesium and the like can combine with carbonate, bicarbonate, hydroxide, sulfide, and/or sulfate ions to form precipitates that cause scaling and fouling. The accumulation of acids in the heating fluid may cause or accelerate corrosion. Fine particles of contaminants such as clays may become trapped in foams or emulsions in the heating fluid. The ingredients in chemical substances (e.g. corrosion inhibitor, dispersant, demulsifier, defoamer, pH control agent, scale inhibitor) that have been added to the process liquid before it enters the apparatus used to perform the present disclosure can be carried into the heating fluid and cause unwanted changes to its properties or otherwise impair its performance.

The HFTM include means to avoid or rectify these problems. The range, types and capacities of the HFTM are expected to vary to match the nature of and severity of contamination and degradation encountered in each particular application.

Any one or more HFTM selected from the following list may be included or adopted:

Adding one or more substances and mixing the added substances with at least a portion of the heating fluid to achieve any one or more of the following effects: to cause a reaction with carbonate and/or bicarbonate contaminants thereby converting at least some of the contaminants into water and/or carbon dioxide; to reduce the oxygen content of the heating fluid; to remove and/or dissolve and/or destroy asphaltenes, resins, gums and/or sludges; to prevent or inhibit the formation of, or enable the removal of, scale or fouling deposits on metal surfaces; to break-down, suppress, or inhibit the formation of, emulsions or foam (e.g. by adding demulsifier or defoamer); to reduce the cloud point and/or freezing point of liquid contaminants; to neutralise acids and/or increase alkalinity and/or inhibit corrosion; to react with dissolved contaminants and cause precipitation of solid matter that can be removed by mechanical means of separation; and to modify one or more of the properties of the heating fluid including but not limited to density, vapour pressure, viscosity, thermal stability, pH, solubility, heat capacity, corrosivity, thermal conductivity, toxicity, and flammability. The added substances may be added to the heating fluid directly or be added to any of the streams that come into contact with the heating fluid.

Removing at least a portion of the heating fluid and replacing said portion with heating fluid having enhanced properties.

Removing mercury from the heating fluid.

Removing liquid contaminants in liquid form from the flash separator.

Heating at least a portion of the heating fluid to a temperature that causes liquid contaminants to vaporise and flow out of the flash separator.

Operating the flash separator at a temperature and pressure that causes or promotes the break-down of emulsions and/or foams.

Applying an electric charge or current to or across at least a portion of the heating fluid to cause ions of contaminating substances to migrate towards electrodes and thereby be removed.

Removing contaminating particles of solid matter by mechanical means of separation including but not limited to any one or more of: centrifuging, settling, clarifying, filtering, and hydrocycloning, at least a portion of the heating fluid. If necessary, chemicals may be added that cause fine particles of contaminants to flocculate or agglomerate into larger masses that can be removed by mechanical means of separation.

Removing acetate and possibly other organic salt contaminants by mixing acidic solutions, e.g. dilute hydrochloric acid, with at least a portion of the heating fluid to cause a reaction that converts at least a portion of the organic salts into volatile organic acids which can then be vaporised and removed.

Any references cited in this specification are hereby incorporated by reference. No admission is made that any reference constitutes prior art. Nor does discussion of any reference constitute an admission that such reference forms part of the common general knowledge in the art, in the United States of America.

Persons of ordinary skill can utilise the disclosures and teachings herein to produce other embodiments and variations without undue experimentation. All such embodiments and variations are considered to be part of this invention.

Accordingly, one of ordinary skill in the art will readily appreciate from the disclosure that later modifications, substitutions, and/or variations performing substantially the same function or achieving substantially the same result as embodiments described herein may be utilised according to such related embodiments of the present invention. Thus, the invention is intended to encompass, within its scope, the modifications, substitutions, and variations to processes, manufactures, means, methods, and/or steps disclosed herein.

The invention claimed is:

1. A method of removing contaminants, including dissolved contaminants, from a feed stream, said feed stream comprising said contaminants and a process liquid, said method comprising steps of:
    (a) heating a heating fluid that has a higher density than that of the feed stream comprising components that are less volatile than the process liquid to produce a heated heating fluid;
    (b) bringing at least a portion of the feed stream into contact with at least a portion of the heated heating fluid to thereby heat and vaporise at least a portion of the process liquid thereby causing at least a portion of the dissolved contaminants to form precipitated solid matter;
    (c) enabling at least a portion of the heating fluid to mix with at least a portion of the precipitated solid matter thereby producing a depleted mixture that comprises at least a portion of the heating fluid and at least a portion of the precipitated solid matter;
    (d) mixing a salt solvent with at least a portion of the depleted mixture whereby said salt solvent dissolves at least a portion of the precipitated solid matter, to create a waste solution that comprises at least a portion of the contaminants; and
    (e) separating at least a portion of the waste solution from the heating fluid.

2. The method as claimed in claim 1 wherein the process liquid comprises any one or more liquids selected from the group consisting of: mono-ethylene glycol; diethylene glycol; triethylene glycol; and amines.

3. The method as claimed in claim 1 wherein the dissolved contaminants comprise any one or more of: monovalent salts including sodium chloride;
    divalent ions including calcium; and organic acid salts including acetate.

4. The method as claimed in claim 1 wherein the heating fluid comprises components that are immiscible with the process liquid and the salt solvent.

5. The method as claimed in claim 1 wherein at least 90% of the process liquid that contacts the heated heating fluid is vaporised.

6. The method as claimed in claim 1 wherein a flash separator is operated at a pressure below atmospheric pressure.

* * * * *